(12) United States Patent
Gheorghe et al.

(10) Patent No.: US 9,954,967 B1
(45) Date of Patent: Apr. 24, 2018

(54) METHODS AND APPARATUS FOR USING A WIRELESS ACCESS POINT STORAGE DEVICE ONBOARD AN AIRCRAFT

(71) Applicant: HONEYWELL INTERNATIONAL INC., Morris Plains, NJ (US)

(72) Inventors: Laurentiu Mihai Gheorghe, Glendale, AZ (US); Subbarao Venkata Rama Vemula, Bangalore (IN); James Alexander Nicholls, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/332,310

(22) Filed: Oct. 24, 2016

(51) Int. Cl.
| | |
|---|---|
| *G01C 21/00* | (2006.01) |
| *G01C 23/00* | (2006.01) |
| *H04L 29/08* | (2006.01) |
| *H04W 48/04* | (2009.01) |
| *H04W 28/02* | (2009.01) |
| *G07C 5/02* | (2006.01) |
| *H04W 88/08* | (2009.01) |

(52) U.S. Cl.
CPC ............ *H04L 67/28* (2013.01); *G07C 5/02* (2013.01); *H04W 28/0231* (2013.01); *H04W 48/04* (2013.01); *H04W 88/08* (2013.01)

(58) Field of Classification Search
CPC combination set(s) only.
See application file for complete search history.

(56) References Cited

U.S. PATENT DOCUMENTS

| | | | |
|---|---|---|---|
| 6,438,468 B1 * | 8/2002 | Muxlow | G08G 5/0013 |
| | | | 701/29.1 |
| 6,775,545 B2 | 8/2004 | Wright et al. | |
| 9,103,687 B1 | 8/2015 | Loo et al. | |
| 9,284,045 B1 * | 3/2016 | Springer | G08G 5/003 |
| 2004/0056766 A1 | 3/2004 | Butz et al. | |

(Continued)

FOREIGN PATENT DOCUMENTS

| | | |
|---|---|---|
| EP | 3002928 A1 | 4/2016 |
| WO | 2015/096978 A1 | 7/2015 |

OTHER PUBLICATIONS

ForeFlight, "ForeFlight Mobile EFB" itunes App Store, Jul. 20, 2016.

(Continued)

*Primary Examiner* — Travis Hunnings
(74) *Attorney, Agent, or Firm* — Lorenz & Kopf, LLP

(57) ABSTRACT

A method for uploading flight data into one or more avionics systems onboard an aircraft is provided. The method establishes a communication connection to one or more remote servers; downloads a set of flight data via the communication connection; transmits the set of flight data to a wireless access point storage device onboard the aircraft; receives wireless data transmissions comprising the set of flight data, wherein the wireless access point storage device is communicatively coupled to a data loader device, and wherein the data loader device is communicatively coupled to one or more avionics systems onboard the aircraft; extracts the set of flight data from the wireless access point storage device inserted into a storage device reader of the data loader device, wherein the extracting is performed by the data loader device; and transmits the set of flight data to the one or more avionics systems.

19 Claims, 9 Drawing Sheets

(56) References Cited

U.S. PATENT DOCUMENTS

2009/0176475 A1* 7/2009 Salkini ...................... G01S 5/02
  455/404.1
2016/0093221 A1* 3/2016 Bailey .................. G08G 5/0039
  701/120

OTHER PUBLICATIONS

Extended EP Search Report for Application No. 17196953.8 dated Mar. 8, 2018.

* cited by examiner

METHODS AND APPARATUS FOR USING A WIRELESS ACCESS POINT STORAGE DEVICE ONBOARD AN AIRCRAFT

TECHNICAL FIELD

Embodiments of the subject matter described herein relate generally to using a storage element that is accessible via wireless communication. More particularly, embodiments of the subject matter relate to using a wireless access point storage device as a storage intermediary for aircraft onboard data loading.

BACKGROUND

Navigation data, flight plan data, avionics application software, and other forms of data applicable to operation of an aircraft are generally uploaded to one or more avionics systems onboard the aircraft prior to flight. The current process requires transportation of physical media, by a user, to the airplane to transfer data. Current methods of flight data loading into avionics systems onboard the aircraft include downloading applicable flight data, via any computer device or system external to the aircraft, onto some form of storage media (e.g., SD card, USB drive, external hard drive, etc.), carrying the storage media into the cockpit of an aircraft, connecting the storage media to applicable avionics systems in the cockpit, and loading the flight data from the storage media. The flight data upload is thus limited to the contents of the original upload, and is not altered or updated during use.

Accordingly, it is desirable to provide a capability for obtaining flight data and perform an upload of the flight data inside the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for uploading flight data into one or more avionics systems onboard an aircraft. The method establishes, by a computing device, a communication connection to one or more remote servers; downloads, by the computing device, a set of flight data via the communication connection; transmits, by the computing device, the set of flight data to a wireless access point storage device onboard the aircraft; receives, by the wireless access point storage device, wireless data transmissions comprising the set of flight data, wherein the wireless access point storage device is communicatively coupled to a data loader device, and wherein the data loader device is communicatively coupled to one or more avionics systems onboard the aircraft; extracts the set of flight data from the wireless access point storage device inserted into a storage device reader of the data loader device, wherein the extracting is performed by the data loader device; and transmits, by the data loader device, the set of flight data to the one or more avionics systems, via an avionics communication bus onboard the aircraft.

Some embodiments disclose a system for uploading flight data into one or more avionics systems onboard an aircraft. The system includes: a computing device communicatively coupled to a wireless access point storage device and the navigation system, wherein the computing device is configured to: establish a communication connection to one or more remote servers; download a set of flight data via the communication connection; and transmit the set of flight data to the wireless access point storage device onboard the aircraft; the wireless access point storage device positioned inside a storage device reader slot of a data loader device, the wireless access point storage device configured to: receive wireless data transmissions comprising at least the set of flight data; and permit extraction of the set of flight data by the data loader device; and the data loader device communicatively coupled to the one or more avionics systems onboard the aircraft, the data loader device configured to: extract the set of flight data from the wireless access point storage device inserted into the storage device reader slot of the data loader device; and transmit the flight data to the one or more avionics systems.

Some embodiments disclose a flight data upload apparatus onboard an aircraft, the flight data upload apparatus comprising: a wireless access point storage device configured to: receive wireless data transmissions via a first wireless communication connection to a computing device, the wireless data transmissions comprising at least a set of flight data; store the set of flight data in a memory element of the wireless access point storage device, to create a stored set of flight data; and establish a physical communication connection to a data loader device, the physical communication connection configured for data extraction from the wireless access point storage device; and the data loader device communicatively coupled to one or more avionics systems onboard the aircraft, the data loader device configured to: extract the stored set of flight data via the physical communication connection, to create an extracted set of flight data; and transmit the extracted set of flight data to the one or more avionics systems.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for performing an upload of various forms of flight data, wherein the steps associated with obtaining and uploading the data are performed inside the aircraft and at any time that a new flight data upload is desired. More specifically, the present disclosure relates to a system that includes a data loader device that reads a storage medium that stores flight data applicable to a current aircraft and/or flight. The storage medium is equipped with wireless communication functionality, and receives the flight data as a wirelessly-communicated data upload from a computing device within wireless range of the storage medium.

Certain terminologies are used with regard to the various embodiments of the present disclosure. A wireless access point storage device is a memory storage element that includes integrated wireless communication capabilities, and may be implemented using a secure digital (SD) card, a universal serial bus (USB) drive, an external hard drive, and/or any type of storage media equipped with wireless communication hardware (e.g., a receiver, a transceiver). A data loader device is a is an apparatus that functions to read, extract, or otherwise obtain flight data from a wireless access point storage device and to transmit the obtained flight data to one or more avionics systems onboard the aircraft. Avionics systems onboard an aircraft may refer to a flight management system (FMS) and/or one or more display units including, but not limited to, a Primary Flight Display (PFD), Multi-Function Display (MFD), Engine Indication and Crew Alerting System (EICAS), an Integrated Air Computer (IAC) or any other avionics system that is communicatively coupled to a data loader device and which is configured to receive flight data from the data loader device.

Figure 1:
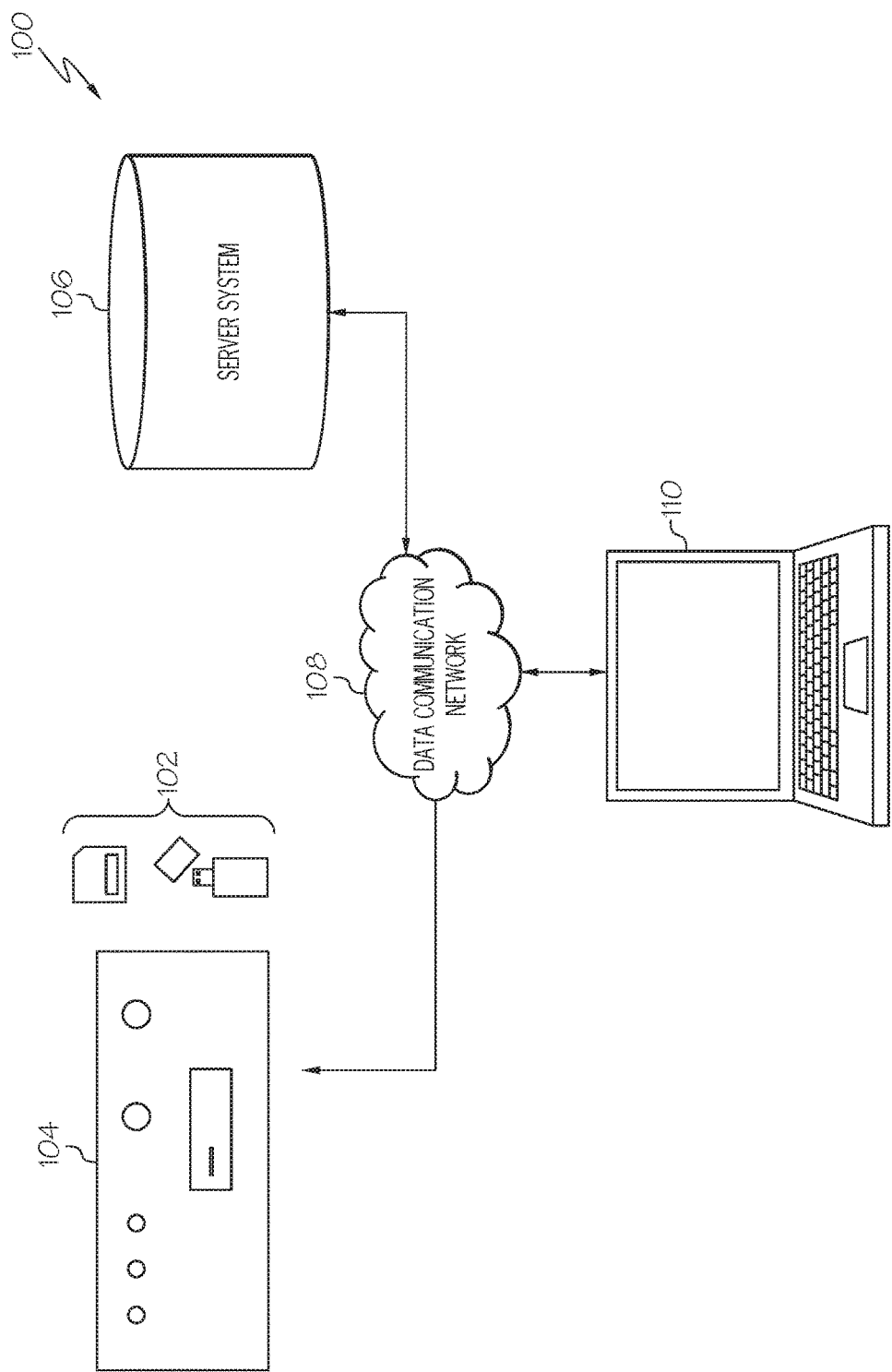
FIG. 1 is a diagram of a flight data upload system, in accordance with the disclosed embodiments.
Figure 3:
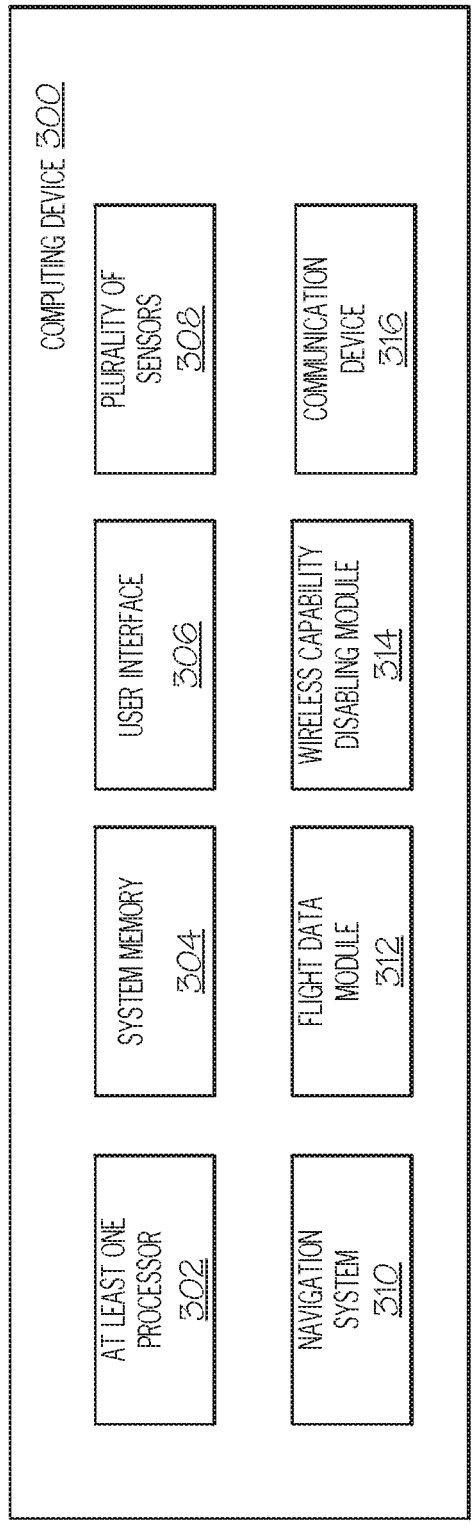
FIG. 3 is a functional block diagram of a computing device, in accordance with the disclosed embodiments.

Turning now to the figures, FIG. 1 is a diagram of a flight data upload system 100, in accordance with the disclosed embodiments. The flight data upload system 100 includes a computing device 110 in communication with a server system 106 and a wireless access point storage device 102. The computing device 110 may be implemented using a laptop computer, a tablet computer, a smartphone, a smartwatch, a personal digital assistant (PDA), or any other computer that includes a system memory element, at least one processor, and some form of input/output (I/O). One implementation of the computing device 110 is shown in FIG. 3, including additional detail. The server system 106 may include any number of application servers, and each server may be implemented using any suitable computer. In some embodiments, the server system 106 includes one or more dedicated computers. In some embodiments, the server system 106 includes one or more computers carrying out other functionality in addition to server operations.

The computing device 110 communicates with the server system 106 via the data communication network 108. The computing device 110 and the server system 106 are generally disparately located. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During normal operation, the computing device 110 downloads flight data from the server system 106. The flight data may include, without limitation: navigational databases, navigational charts, terrain and obstacle databases, and/or any other type of data applicable to a particular aircraft or flight. Downloaded flight data may also include other data that is not necessarily associated with a particular flight, but that is crucial to the operation of the wireless access point storage device 102, such as: technical documentation, aircraft configuration data, aircraft personality module data, and software that runs on the wireless access point storage device 102. Flight data may also include avionics applications software (e.g., display software, FMS software). In certain embodiments, the flight data is downloaded via a downloadable software application (i.e., an "app") executed on the computing device 110, such as an electronic flight bag (EFB) application.

The computing device 110 is generally located within a wireless communication range of a wireless access point storage device 102. In exemplary embodiments of the invention, the computing device 110 and the wireless access point storage device 102 are located onboard an aircraft and are communicatively coupled via a wireless implementation of the data communication network 108. After downloading applicable flight data from the server system 106, the computing device 110 is further configured to transmit the downloaded flight data, via the data communication network 108, to a wireless access point storage device 102 onboard the aircraft. The wireless access point storage device 102 is a memory storage element that includes integrated wireless communication capabilities. Exemplary embodiments of the wireless access point storage device 102 may include a Commercially-Off-The Shelf (COTS) Toshiba FlashAir™ Wireless LAN Model SD card that has been modified to receive wireless communications in the form of a transmitted data upload. The wireless access point storage device 102 generally includes a radio frequency receiver or transceiver and a memory hardware element. The wireless access point storage device 102 may be implemented using a secure digital (SD) card, a universal serial bus (USB) drive, an external hard drive, and/or any type of storage media equipped with wireless communication capabilities.

The wireless access point storage device 102 communicates with a data loader device 104 that is communicatively coupled to one or more avionics systems onboard the aircraft. The data loader device 104 is an apparatus that functions to read, extract, or otherwise obtain flight data from the wireless access point storage device 102, and to transmit the obtained flight data to one or more avionics systems onboard the aircraft. The data loader device 104 is implemented using a DL-1000 dataloader, a data management unit (DMU), a data LAN management unit (DLMU) data loader, or any other type of data loader device configured to receive and read data from some form of physical media, and to transmit the data read from the inserted or communicatively coupled physical media to one or more avionics systems onboard the aircraft. The wireless access point storage device 102 functions as a receiver and storage repository for flight data, and the data loader device 104 transmits the flight data to systems onboard the aircraft that require the flight data for operation.

In certain embodiments, the wireless access point storage device 102 and the data loader device 104 may be implemented as separate and distinct, communicatively-coupled apparatuses. In other embodiments, however, the wireless access point storage device 102 and the data loader device 104 may be implemented as a single, integrated apparatus that performs the functionality of both the wireless access point storage device 102 and the data loader device 104. Whether implemented as separate or integrated apparatuses, the combination of the wireless access point storage device 102 and the data loader device 104 may be referred to as a "flight data upload apparatus". The flight data upload apparatus functions to (1) receive new flight data uploads inside the cockpit of the aircraft; (2) provide the new flight data uploads to one or more avionics systems onboard the aircraft; and (3) download fault event logs from the avionics.

Figure 2:
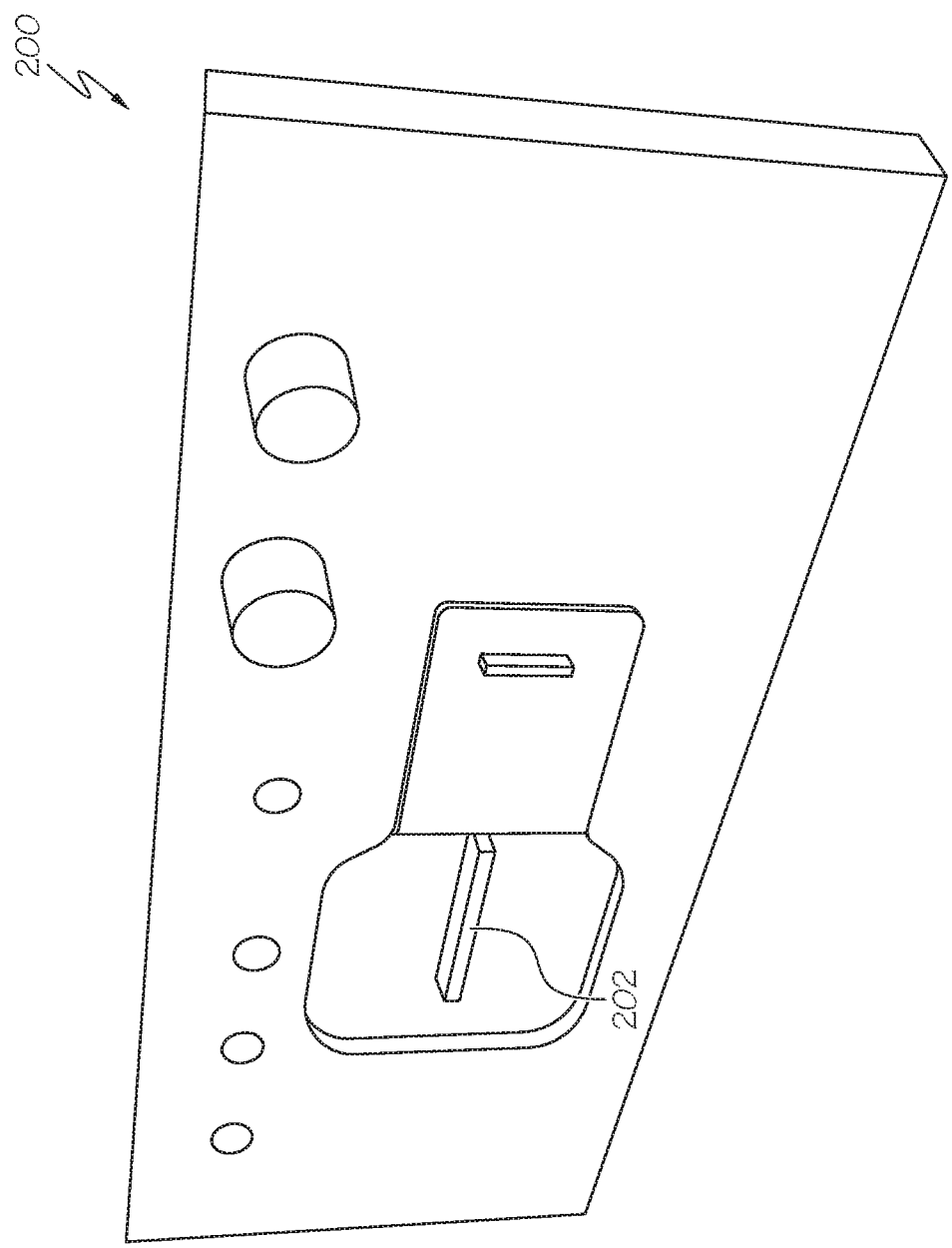
FIG. 2 is a diagram of a data loader device, in accordance with the disclosed embodiments.

FIG. 2 is a diagram of a data loader device 200, in accordance with the disclosed embodiments. As described in FIG. 1, the data loader device 200 is configured to establish a communication connection with a wireless access point storage device (see reference 102, FIG. 1), which is generally implemented using a Secure Digital High Capacity card, which may be referred to as an SDHC card or an SD card. An SDHC card or SD card is usually associated with a standardized size and shape. The data loader device 200 is capable of receiving the wireless access point storage device via a standard receptacle 202.

Figure 9A:
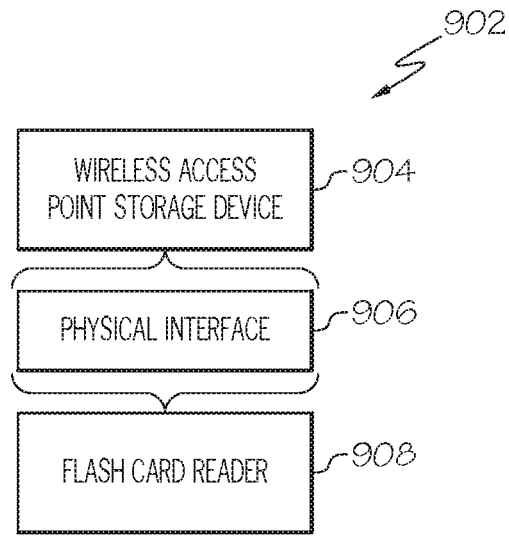
FIGS. 9A-9B are diagrams of an interface between a data loader device and a wireless access point storage device, in accordance with the disclosed embodiments.
Figure 9B:
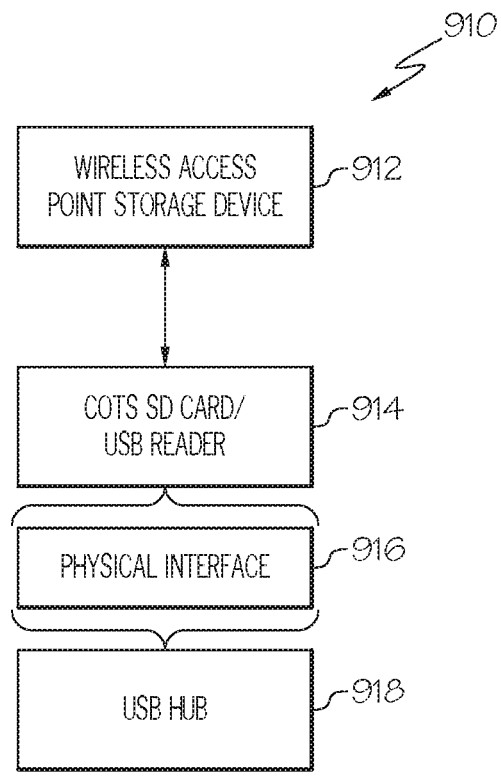

The data loader device 200 is configured to interface with a wireless access point storage device via an interface. FIGS. 9A-9B illustrate two particular embodiments of such an interface configuration 902, 910 between a data loader device and a wireless access point storage device. FIG. 9A is a first interface configuration 902, which includes wireless access point storage device 904, a physical interface 906, and a flash card reader 908. In the first interface configuration 902, the wireless access point storage device 904 is implemented using a "flash card" (e.g., an SD card, a micro-SD card, or other compatible memory storage card). Here, the flash card reader 908 is any standard SD card interface. The data loader device (not shown) uses the flash card reader 908, via the physical interface 906, to read, extract, or otherwise obtain data uploaded and stored on the wireless access point storage device 904.

FIG. 9B is a second interface configuration 910, which includes a wireless access point storage device 912, a commercial-off-the-shelf (COTS) SD card/Universal Serial Bus (USB) reader 914, a physical interface 916, and a USB hub 918. In the second interface configuration 910, the wireless access point storage device 912 is also implemented using a flash card, but in this configuration, the data loader device (not shown) may not be equipped with a flash card reader, such as that shown in FIG. 9A. In the second interface configuration 910, the data loader device is instead equipped with a standard Universal Serial Bus (USB) port, through which the wireless access point storage device may communicate with the data loader device.

Figure 10:
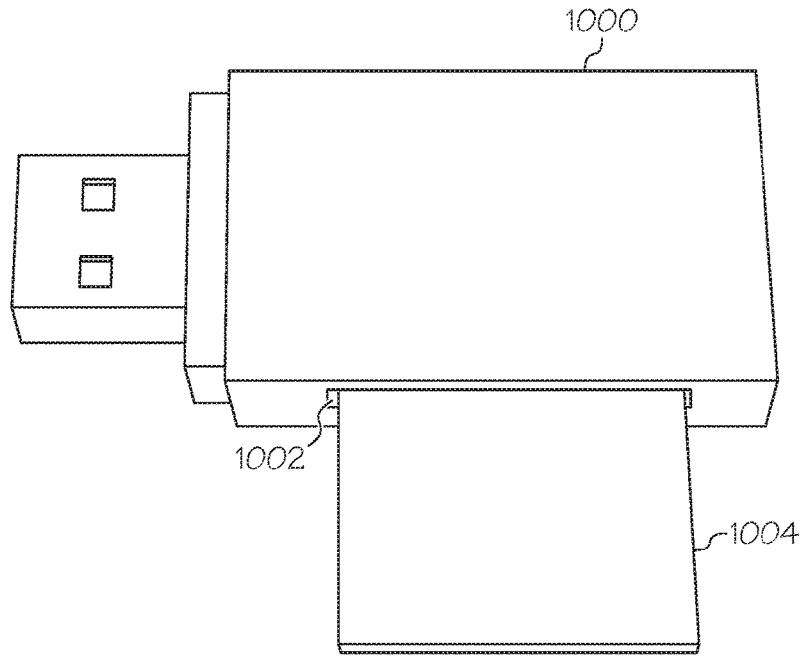
FIG. 10 is a diagram of a commercial off the shelf (COTS) SD Card reader compatible with Universal Serial Bus (USB) data transmission.

Here, the COTS SD card/USB reader 914 receives the wireless access point storage device (e.g., a flash card), and the COTS SD card/USB reader 914 interacts directly with the USB hub 918 of the data loader device. One implementation of a COTS SD card/USB reader 914 is shown in FIG. 10. The COTS SD card/USB reader device 1000 acts as an additional interface between the flash card 1004 and the data loader device that lacks a flash card reader. The COTS SD card/USB reader device 1000 includes an internal flash card reader 1002 that receives the flash card 1004 and obtains data stored on the flash card 1004 for transmission to the data loader through the USB port.

Returning to FIG. 2, the data loader device 200 is capable of receiving the wireless access point storage device via a standard receptacle 202, and the standard receptacle 202 may be implemented as a flash card reader, a USB port, or the like.

FIG. 3 is a functional block diagram of a computing device 300, in accordance with the disclosed embodiments. It should be noted that the computing device 300 can be implemented with the computing device 110 depicted in FIG. 1. In this regard, the computing device 300 shows certain elements and components of the computing device 110 in more detail. The computing device 300 generally includes at least one processor 302, a system memory 304 element, a user interface 306, a plurality of sensors 308, a navigation system 310, a flight data module 312, a wireless capability disabling module 314, and a communication device 316. These elements and features of the computing device 300 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 3. Moreover, it should be appreciated that embodiments of the computing device 300 will include other elements, modules, and features that cooperate to support the desired functionality. For simplicity, FIG. 3 only depicts certain elements that relate to the flight data upload techniques described in more detail below.

The at least one processor 302 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 302 may be realized as one or more microprocessors, controllers, microcontrollers, or state machines. Moreover, the at least one processor 302 may be implemented as a combination of computing devices, e.g., a combination of digital signal processors and microprocessors, a plurality of microprocessors, one or more microprocessors in conjunction with a digital signal processor core, or any other such configuration.

The at least one processor 302 communicates with the system memory 304 element. The system memory 304 may be realized using any number of devices, components, or modules, as appropriate to the embodiment. Moreover, the computing device 300 could include system memory 304 integrated therein and/or system memory 304 operatively coupled thereto, as appropriate to the particular embodiment. In practice, the system memory 304 could be realized as RAM memory, flash memory, EPROM memory, EEPROM memory, registers, a hard disk, a removable disk, or any other form of storage medium known in the art. In certain embodiments, the system memory 304 includes a hard disk, which may also be used to support functions of the computing device 300. The system memory 304 can be coupled to the at least one processor 302 such that the at least one processor 302 can read information from, and write information to, the system memory 304. In the alternative, the system memory 304 may be integral to the at least one processor 302. As an example, the at least one processor 302 and the system memory 304 may reside in a suitably designed application-specific integrated circuit (ASIC).

The user interface 306 may include or cooperate with various features to allow a user to interact with the computing device 300 components onboard the aircraft. Accordingly, the user interface 306 may include various human-to-machine interfaces, e.g., a keypad, keys, a keyboard, buttons, switches, knobs, a touchpad, a joystick, a pointing device, a stylus, a virtual writing tablet, a touch screen, a microphone, or any device, component, or function that enables the user to select options, input information, or otherwise control the operation of the computing device 300. For example, the user interface 306 could be manipulated by an operator to enter user credentials, user selections of a particular aircraft, and user selections of a particular flight database or other flight data, as described herein.

In certain embodiments, the user interface 306 may include or cooperate with various features to allow a user to interact with the computing device 300 via graphical elements rendered on a display element. Accordingly, the user interface 306 may initiate the creation, maintenance, and presentation of a graphical user interface (GUI). In certain embodiments, the display element of the user interface implements touch-sensitive technology for purposes of interacting with the GUI. Thus, a user can manipulate the GUI by moving a cursor symbol rendered on the display element, or by physically interacting with the display element itself for recognition and interpretation, via the user interface 306.

The plurality of sensors 308 is configured to obtain a current speed of the aircraft, when the computing device 300 is located onboard the aircraft. The plurality of sensors 308 may be implemented using a global positioning system (GPS), standalone accelerometers or an Inertial Measurement Unit (IMU) comprising one or more accelerometers, gyroscopes, and compasses. In certain embodiments of the plurality of sensors 308 may be implemented using the navigation system 310, which may be equipped to obtain the current aircraft speed. The aforementioned sensor can be used to determine the speed of the aircraft for the purpose of cockpit safety and reduction of electromagnetic interference (EMI) in the cockpit during critical phases of flight. By determining the speed of the aircraft using differential analysis.

The navigation system 310 is suitably configured to obtain one or more navigational parameters associated with operation of the aircraft. The navigation system 310 may be realized as a global positioning system (GPS), Inertial Measurement Unit (IMU), or other sensors suitably configured to support operation of the navigation system 310, as will be appreciated in the art. In an exemplary embodiment, the navigation system 310 is capable of obtaining and/or determining the instantaneous position of the aircraft, that is, the current location of the aircraft (e.g., the latitude and longitude) and the altitude or above ground level for the aircraft. In some embodiments, the navigation system 310 may also obtain and/or determine the speed of the aircraft.

The flight data module 312 is configured to interpret user input (obtained via user interface 306) to determine appropriate flight data associated with user credentials and/or particular aircraft associated with user credentials. Flight data may include flight plans, navigation databases, flight databases, weather data, navigational charts, terrain or obstacle databases, a configuration database, software updates for various avionics and avionics systems, pilot check lists or any data applicable to one or more avionics systems onboard an aircraft, which may be uploaded and used by the applicable avionics systems.

In certain embodiments, the flight data module 312 identifies flight data associated with a particular aircraft. In some embodiments, the flight data module 312 identifies flight data associated with a particular aircraft that is associated a particular user, based on flight history. In the first scenario, the flight data module 312 identifies the aircraft and then determines appropriate flight data for upload into the identified aircraft. In the second scenario, a user may log into the computing device 300 and the flight data module 312 first identifies all aircraft that are relevant to that particular user, and second determines appropriate flight data for upload into each of the relevant aircraft. Here, the user may select an aircraft, and the flight data module 312 presents an option to the user (via the user interface 306) to upload flight data applicable to the user-selected aircraft.

The wireless capability disabling module 314 is configured to disable wireless communication capabilities of a wireless access point storage device in communication with the computing device when certain conditions are met. Conditions for disabling the wireless communication capabilities may include, without limitation, when a current aircraft speed (as measured by the computing device navigation system) exceeds a predefined threshold or when a current aircraft location does not permit wireless communication onboard the aircraft, through regulation or law.

Each wireless or any communication device must adhere to the local country radio operating rules. Some Commercial Off-The-Shelf (COTS) devices, such as a wireless access point storage device, may not be certified only in specific countries. In this case, operation of the wireless access point storage device may be permissible in a first country or jurisdiction, but such operation may not be permissible in a second country or jurisdiction, requiring deactivation to comply with the local regulation or law. The wireless capability disabling module 314 is configured to use navigation data (obtained via the navigation system 310 to determine a current location, to identify a current country or jurisdiction by comparing the current location to a locally-stored or remotely accessible database, and to determine whether the current country or jurisdiction does not permit operation of a wireless access point storage device. When operation of the wireless access point storage device is not permitted, the wireless capability disabling module 314 functions to disable the wireless communication capability of the wireless access point storage device.

In practice, the flight data module 312 and/or the wireless capability disabling module 314 may be implemented with (or cooperate with) the at least one processor 302 to perform at least some of the functions and operations described in more detail herein. In this regard, the flight data module 312 and/or the wireless capability disabling module 314 may be realized as suitably written processing logic, application program code, or the like.

The communication device 316 is suitably configured to transmit signals from the computing device 300 and to receive data transmissions from at least a remote server system (see reference 106, FIG. 1). As described in more detail herein, data received by the communication device 316 may include, without limitation flight data, navigation databases, flight plans, and the like. Data provided by the communication device 316 may include, without limitation, requests for particular sets of flight data (e.g., flight plans, navigation databases, and the like). The communication device 316 is compatible with communication protocol described previously (see reference 108, FIG. 1), and may leverage conventional design concepts that need not be described in detail here.

The communication device 316 is configured to establish communication connections to a wireless access point storage device and/or one or more remote servers (as shown in FIG. 1). The communication device 316 operates to obtain applicable flight data from the one or more remote servers, and to transmit (i.e., upload) the obtained flight data to the wireless access point storage device. This enables the computing device 300 to initiate and execute a data upload to a wireless access point storage device onboard the aircraft.

Figure 4:
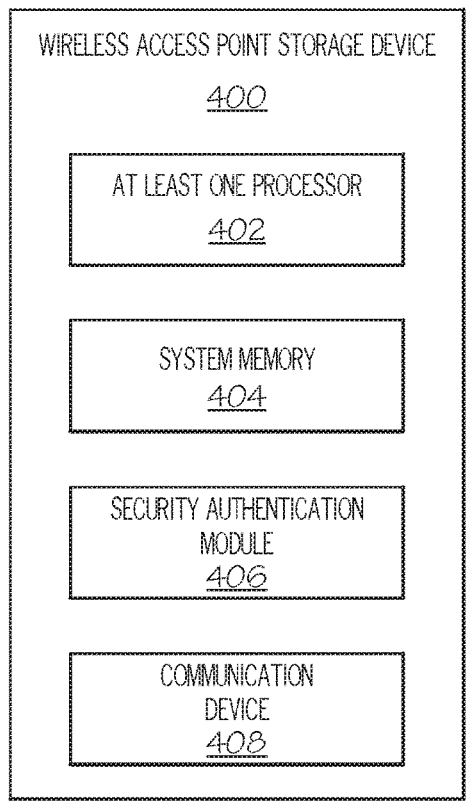
FIG. 4 is a functional block diagram of a wireless access point storage device, in accordance with the disclosed embodiments.

FIG. 4 is a functional block diagram of a wireless access point storage device 400, in accordance with the disclosed embodiments. It should be noted that the wireless access point storage device 400 can be implemented with the wireless access point storage device 102 depicted in FIG. 1, and may be implemented using an SD card, a USB drive, an external hard drive, or any other suitable type of memory. In this regard, the wireless access point storage device 400 shows certain elements and components of the wireless access point storage device 102 in more detail. The wireless access point storage device 400 generally includes, without limitation, a system memory 402 element and a communication device 404. It should be appreciated that FIG. 4 depicts a simplified embodiment of the wireless access point storage device 400, and that some implementations of the wireless access point storage device 400 may include additional elements or components.

The at least one processor 402 and the system memory 404 element of the wireless access point storage device 400 is implemented as described previously, with regard to FIG. 3, and will not be redundantly described here. Any suitable processor and memory hardware used for, and compatible with, an SD card, USB drive, external hard drive, or other memory element may be used. The communication device 408 is also implemented as described previously, with regard to FIG. 3. However, the communication device 408 may be implemented using a receiver device or a transceiver device. Exemplary embodiments of the communication device include a receiver device configured to receive flight data uploads which are then stored in the system memory 404 element. The wireless access point storage device 400 also includes a security authentication module 406 that operates cooperatively with the at least one processor 402 and the system memory 404 to perform security authentication for the wireless access point storage device 400, and to time a generated wireless link after a threshold period of time.

Figure 5:
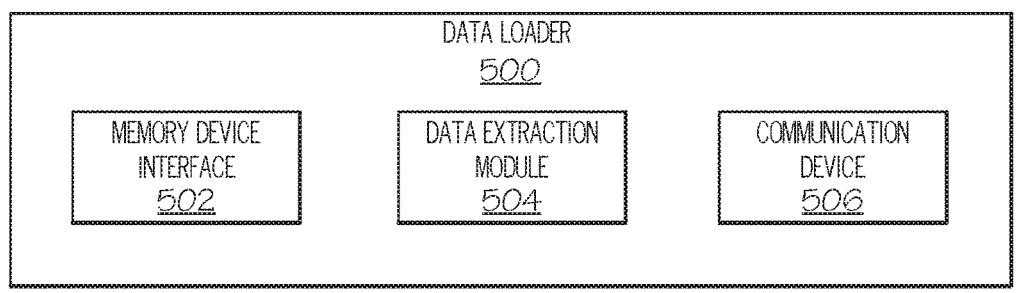
FIG. 5 is a functional block diagram of a data loader device, in accordance with the disclosed embodiments.

FIG. 5 is a functional block diagram of a data loader device 500, in accordance with the disclosed embodiments. It should be noted that the data loader device 500 can be implemented with the data loader device 104 depicted in FIG. 1. In this regard, the data loader device 500 shows certain elements and components of the data loader device 104 in more detail. The data loader device 500 generally includes, without limitation, a memory device interface 502, a data extraction module 504, and a communication device 506. It should be appreciated that FIG. 5 depicts a simplified embodiment of the data loader device 500, and that some implementations of the data loader device 500 may include additional elements or components.

The memory device interface 502 is configured to communicatively couple the data loader device 500 with a wireless access point storage device (shown in FIG. 4). The memory device interface 502 is generally implemented using a slot, port, card reader, or other communication interface of the data loader device 500. In certain embodiments, the memory device interface 502 may be implemented using a wireless communication interface. However, the memory device interface 502 usually corresponds to a particular type of wireless access point storage device. For example, in embodiments where the wireless access point storage device is implemented using an SD card, the memory device interface 502 is an SD card reader, and in embodiments where the wireless access point storage device is implemented using a USB drive, the memory device interface 502 is a USB port.

The data extraction module 504 is configured to read, extract, or otherwise obtain flight data from a wireless access point storage device that is communicatively coupled to the data loader device 500 via the memory device interface 502. In this way, the data loader device 500 acquires flight data that has been uploaded to the wireless access point storage device, for further transmission via the communication device 506.

The communication device 506 is communicatively coupled to one or more avionics devices onboard the aircraft (not pictured), and is configured to transmit obtained flight data to the one or more avionics systems. In certain embodiments, the communication device 506 is communicatively coupled to a data bus connected to a plurality of avionics systems onboard the aircraft, which enables the data loader device 500 to transmit the obtained flight data via the data bus during each operation. In some embodiments, however, the communication device 506 is directly connected, via wired or wireless connection, to one or more avionics systems onboard the aircraft, and transmits the obtained flight data via these wired or wireless connections. Thus, the data loader device 500 functions as a data extractor and a data transmitter onboard the aircraft, such that new or additional flight data may be uploaded via the wireless access point storage device onboard the aircraft.

Figure 6:
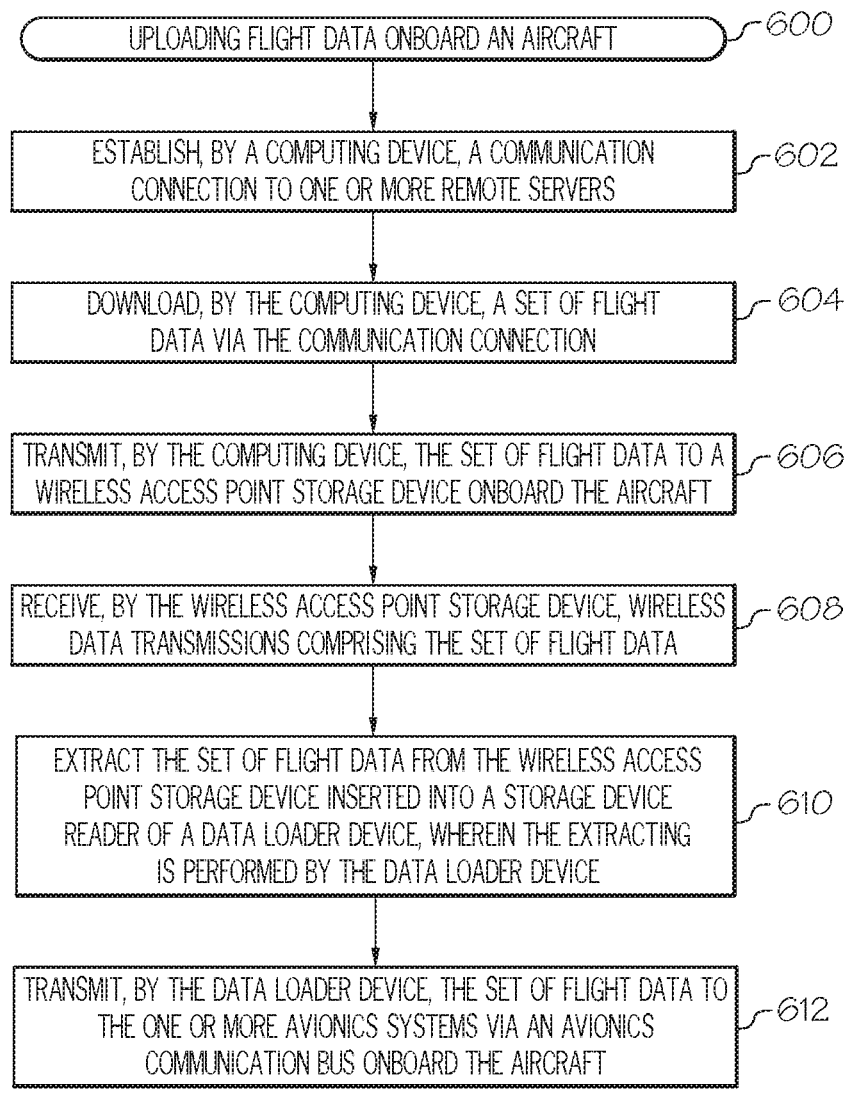
FIG. 6 is a flow chart that illustrates an embodiment of a process for uploading flight data onboard an aircraft.

FIG. 6 is a flow chart that illustrates an embodiment of a process 600 for uploading flight data onboard an aircraft. The various tasks performed in connection with process 600 may be performed by software, hardware, firmware, or any combination thereof. For illustrative purposes, the following description of process 600 may refer to elements mentioned above in connection with FIGS. 1-5. In practice, portions of process 600 may be performed by different elements of the described system. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

For ease of description and clarity, it is assumed that the process 600 begins by establishing, by a computing device, a communication connection to one or more remote servers (step 602). The process 600 then downloads, by the computing device, a set of flight data via the communication connection (step 604). The communication connection is generally established via a wireless data communication network, as described previously with regard to FIG. 1. However, in other embodiments, the process 600 may establish a wired communication connection to a remote server for purposes of obtaining the set of flight data. After downloading the set of flight data (step 604), the process 600 transmits, by the computing device, the set of flight data to a wireless access point storage device onboard the aircraft (step 606).

The process 600 then receives, by the wireless access point storage device, wireless data transmissions comprising the set of flight data (step 608). Here, the process 600 uses the computing device as an intermediary between the remote server and the wireless access point storage device, which is used to obtain the required set of flight data, from the remote server, for upload into an aircraft via the wireless access point storage device.

Next, the process 600 extracts the set of flight data from the wireless access point storage device inserted into a storage device reader of a data loader device, wherein the extracting is performed by the data loader device (step 610). The process 600 then transmits, by the data loader device, the set of flight data to the one or more avionics systems via an avionics communication bus onboard the aircraft (step 612). Once the data is uploaded to the wireless access point storage device, it is accessible to the avionics systems onboard the aircraft via the data loader device. The process 600 uses the data loader device to read, extract, or otherwise obtain the set of flight data from the wireless access point storage device, and to transmit the set of flight data to one or more avionics systems. Obtained flight data may include, without limitation: (1) flight plans, which includes critical items for the aircraft and the flight crew members, and that determines the route an aircraft uses to travel from a departure location to a destination location; (2) navigation databases, which include the location of navigational aids (not limited to airports, runways, radio beacons, way points, airways) and associated information; (3) Obstacle databases, which include a geographical location, an elevation, and a height of one or more obstacles (e.g., building, towers, chimneys, bridge piers); (4) navigational charts, which are crucial to departure and approach portions of flights, and which provide critical information to flight crew members when the aircraft is on the ground and when the aircraft enters the airspace around an airport; (5) terrain databases, which includes the geographical location, elevation of the terrain at regular intervals used for synthetic vision systems (SVS) onboard the aircraft that present a 3-dimensional representation of the terrain over which the aircraft is flying; (6) configuration data, which include aircraft and avionics configuration parameters (e.g., ceiling altitude, installation of optional LRUs, number of sensors used by avionics software to configure specific features and functions); (7) software updates for various avionics and avionics systems, including application software of avionics units (e.g., displays, flight management system (FMS)); and (8) flight check lists associated with various phases of flight.

Figure 7:
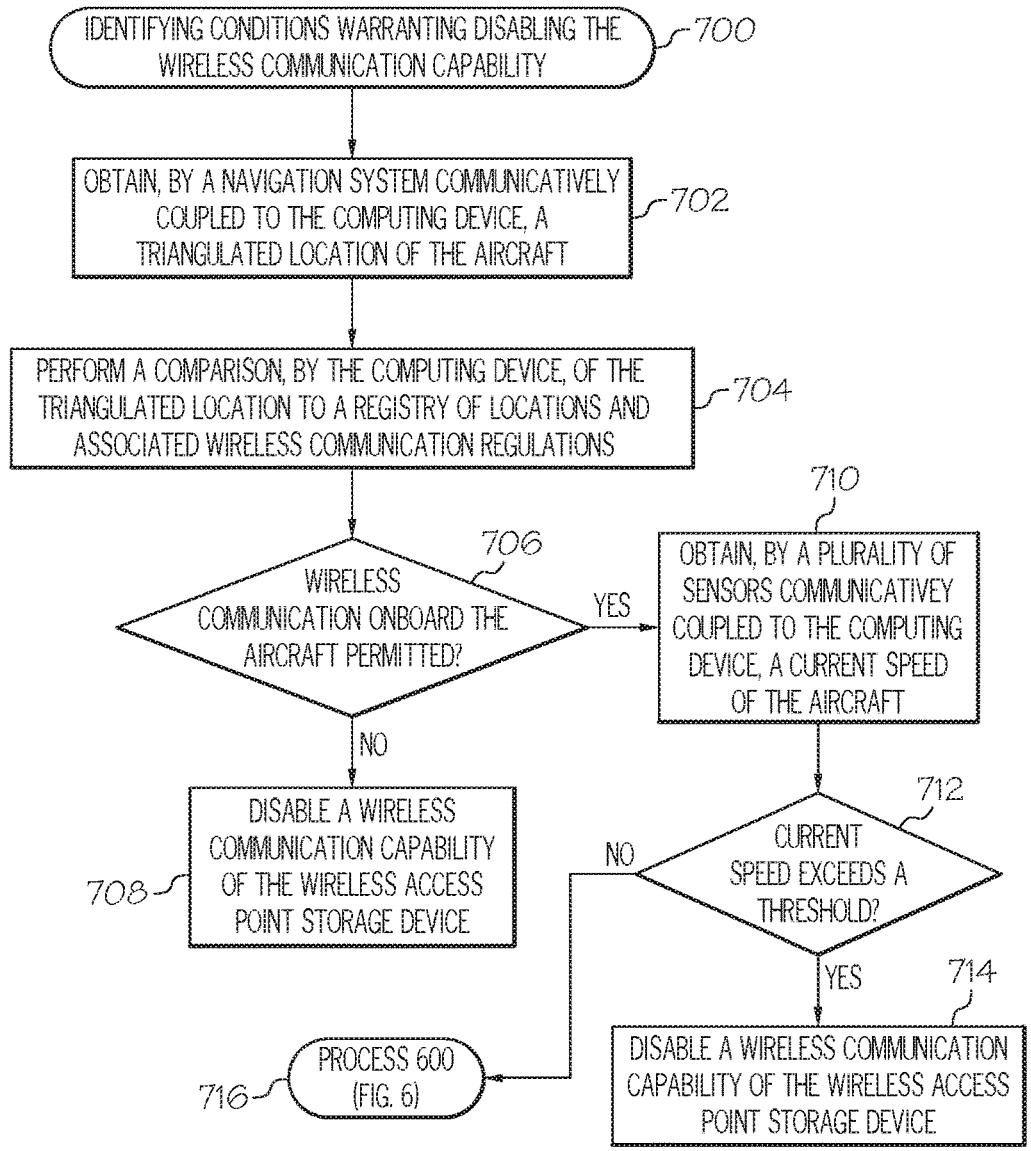
FIG. 7 is a flow chart that illustrates an embodiment of a process for identifying conditions warranting disabling the wireless communication capability.

FIG. 7 is a flow chart that illustrates an embodiment of a process 700 for identifying conditions warranting disabling a wireless communication capability and/or wireless communication hardware of a wireless access point storage device used onboard an aircraft. Exemplary embodiments of the present disclosure evaluate conditions that may or may not necessitate deactivation of wireless communications onboard the aircraft, as described herein. First, the process 700 obtains, by a navigation system communicatively coupled to the computing device, a triangulated location of the aircraft (step 702). The triangulated location may include any suitable indication of location, including but not limited to, latitude and longitude values, city, state, country, or the like.

Next, the process 700 performs a comparison, by the computing device, of the triangulated location to a registry of locations associated with wireless communication regulations (step 704). The process 700 then determines whether wireless communication onboard the aircraft is permitted, based on the comparison (decision 706). Different locations are generally associated with different laws, regulations, or rules governing the legality and/or permissibility of wireless communication technology. Here, the process 700 identifies these regulations or laws stored in an accessible memory storage location (e.g., onboard the aircraft, a remotely located server, or the like), compares the current location of the aircraft to locations of laws or rules prohibiting the use of wireless communication capabilities onboard the aircraft, and determines whether the use of wireless communication capabilities onboard the aircraft is prohibited at the current location of the aircraft.

Generally, equipment configured to communicate wirelessly is required to adhere to local radio operating regulations, which may be associated with a country, state, locale, jurisdiction, or other indication of geographic location. Examples of local radio operating regulations may include, without limitation: Federal Communications Commission (FCC) regulations in the United States of America (USA), Canadian Radio-television and Telecommunications Commission (CRTC) regulations in Canada, or the like. Wireless equipment generally includes markings from these regulatory bodies (e.g., an FCC identifier in the USA, a European Conformity (CE) identifier in Europe, an Industry Canada (IC) identifier in Canada, a China Ministry of Industry and Information Technology (CMIIT) identifier in China, or the like) indicating conformance to the local radio rules, laws, or regulations. The use of a wireless device is generally permitted in a country to which the wireless device conforms to the local radio laws. Here, the process 700 may identify a current location of a wireless access point device and an associated computing device via a global positioning system (GPS), an inertial system, or a cellular communication connection, and then performs a comparison to determine whether the current location (e.g., country) is on a stored list indicating conformity of the wireless access point device and the associated computing device to local laws. If the current location (e.g., country) is not on the stored list, the computing device disables wireless communication to the wireless access point storage device. Such a disabling or deactivation of wireless communication between the computing device and the wireless access point storage device prevents unauthorized operation in violation of local laws.

When the process 700 determines that wireless communication onboard the aircraft is not permitted (the "No" branch of 706) based on the location of the aircraft, the process 700 disables a wireless communication capability of the wireless access point storage device (step 708). Here, the process 700 identifies a match between a stored location where wireless communication onboard the aircraft is not permitted, and the current location of the aircraft. In response, the process 700 deactivates the wireless access point storage device such that it is not operable to receive data uploads. However, in cases when the process 700 determines that wireless communication onboard the aircraft is permitted (the "Yes" branch of 706), the process 700 then moves on to obtain, by a plurality of sensors communicatively coupled to the computing device, a current speed of the aircraft (step 710). The process 700 then determines whether the current speed exceeds a predefined threshold (decision 712).

In addition to disabling a wireless communication capability based on a location of the aircraft (see steps 702-708), when the process 700 determines that the current speed exceeds a predefined threshold (the "Yes" branch of 712), then the process disables a wireless communication capability of the wireless access point storage device (step 714). The wireless access point storage device is generally controlled via a computing device (see reference 300, FIG. 3). The computing device computes a predetermined, safe threshold speed to disable functionality of the wireless access point storage device (see reference 102, FIG. 1). The computing device obtains the current aircraft speed from the navigation system of the computing device, which may be implemented using a GPS or one or more inertial sensors. Because the computing device is located in the cockpit of the aircraft, the speed value obtained from the navigation system of the computing device is used as a current aircraft speed. The computing device monitors the aircraft speed from the navigation system of the computing device and compares the aircraft speed to a predetermined threshold speed. If the aircraft speed exceeds the threshold speed, the computing device (1) sends an instruction to the wireless access storage device to terminate the wireless communication capability, and (2) terminates the communication from the computing device to the wireless access storage device, thereby eliminating any residual wireless communication between the computing device and wireless storage device when the aircraft starts moving and serves as a security interlock.

However, when the process 700 determines that the current speed does not exceed the threshold (the "No" branch of 712), then the process 700 proceeds to complete the process 600 shown in FIG. 6.

Figure 8:
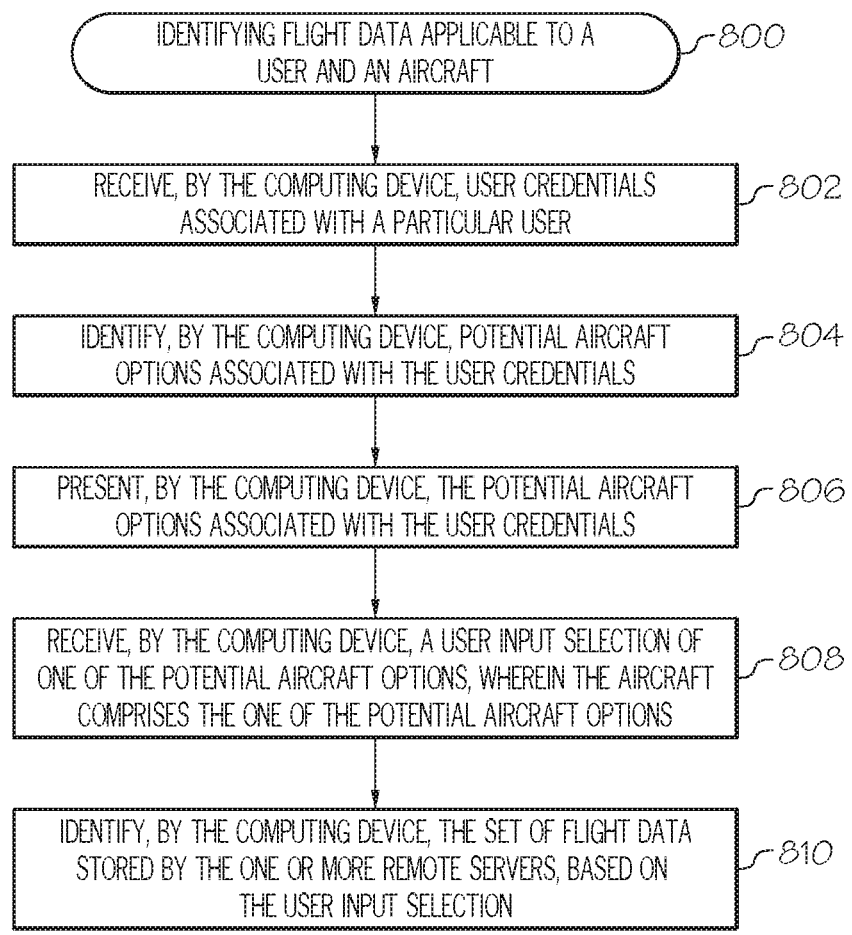
FIG. 8 is a flow chart that illustrates an embodiment of a process for identifying flight data applicable to a user and an aircraft.

FIG. 8 is a flow chart that illustrates an embodiment of a process 800 for identifying flight data applicable to a user and an aircraft. In this particular embodiment, the process 800 identifies appropriate flight data based on user credentials that identify a particular user accessing the computing device in order to locate flight data relevant to a particular aircraft associated with the particular user. First, the process 800 receives, by the computing device, user credentials associated with a particular user (step 802). In certain embodiments, the process 800 receives the user credentials via a graphical user interface presented by an electronic flight bag (EFB) software application executed on a computing device (as described previously with regard to FIG. 3). Received user credentials may include a user name, an account identifier, an aircraft tail number, or the like, and are associated with one or more particular aircraft due to a previous association of a user with a particular aircraft.

Next, the process 800 identifies, by the computing device, potential aircraft options associated with the user credentials (step 804), and then presents, by the computing device, the potential aircraft options associated with the user credentials (step 806). Here, the computing device obtains user credentials such as user name, account identifier, and/or aircraft tail number, along with a password authentication. Once authenticated, the computing device verifies that the user has a valid subscription and determines the configuration and type of the database. Normally, the features and geographical extent of each database is customized according to the preferences of each user. Some features (e.g., airways, obstacles) of the database are customized. The computing device extracts the relevant database from the server.

After presenting the potential aircraft options (step 806), the process 800 receives, by the computing device, a user input selection of one of the potential aircraft options, wherein the aircraft comprises one of the potential aircraft options (step 808). The process 800 then identifies, by the computing device, the set of flight data stored by the one or more remote servers, based on the user input selection (step 810). In this way, the process 800 identifies flight data associated with one particular aircraft that the user has selected, from a list of potential aircraft selections associated with that particular user's profile.

Figure 11:
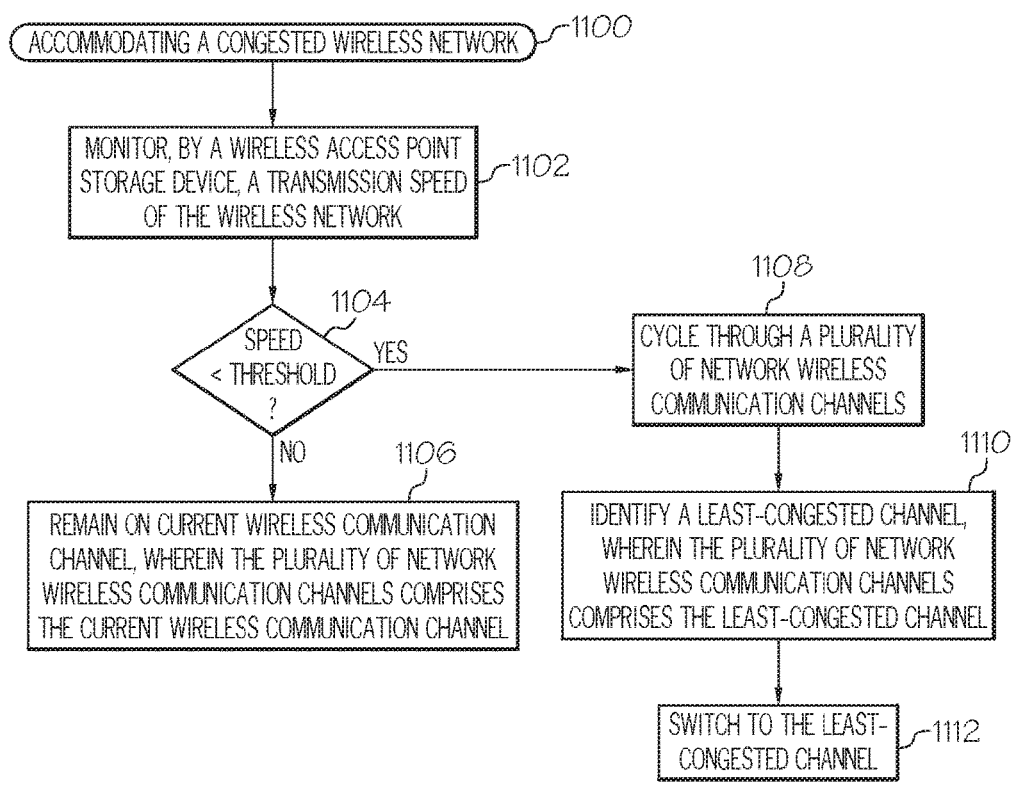
FIG. 11 is a flow chart that illustrates an embodiment of a process for accommodating a congested wireless network, using a wireless access storage device.

FIG. 11 is a flow chart that illustrates an embodiment of a process 1100 for accommodating a congested wireless network, using a wireless access storage device. First, the process 1100 monitors, by a wireless access point storage device, a transmission speed of the wireless network (step 1102), and determines whether the transmission speed is less than a predetermined threshold (decision 1104). The wireless access point storage device generally operates on a 2.4 GHz frequency with wireless channels from 1ch to 11ch in IEEE 802.11b/g/n mode. Each channel represents an increment of 5 MHz. The wireless network is broadcast over 20 MHz in total, covering multiple channels. The wireless access point storage device is normally configured to utilize a default channel and allows the data transmission over the 20 MHz frequency. In an ideal case, this should support the data transfer to the fullest, but in a typical aircraft hangar, multiple devices operates in the same frequency band as the wireless access point storage device, which causes interference and degrades the performance of wireless data transfer using the wireless network. The predetermined threshold is a speed threshold below which the performance of wireless data transfer is degraded.

When the transmission speed of the wireless network is not less than the predetermined threshold (the "No" branch of 1104), the process 1100 remains on the current wireless communication channel, wherein the plurality of network wireless communication channels comprises the current wireless communication channel (step 1106). Here, the process 1100 determines that, since the current data transmission speed is above the threshold, data transfer is occurring at an acceptable performance level, and the process 1100 permits the wireless access point storage device to continue operating using the current wireless communication channel.

However, when the transmission speed of the wireless network is less than the predetermined threshold the "Yes" branch of 1104), the process 1100 cycles through a plurality of network wireless communication channels (step 1108)

and identifies a least-congested channel, wherein the plurality of network wireless communication channels comprises the least-congested channel (step 1110).

A transmission speed of the wireless network that is less than the predetermined threshold indicates degraded performance of the wireless network. When this scenario occurs, the process 1100 seeks the use of a different wireless communication channel that includes a faster transmission speed than the current wireless communication channel. The wireless access point storage device may access network wireless communication channels in a few ways. In certain embodiments, the wireless access point storage device may read a Received Signal Strength Indicator (RSSI) of the client devices defined in the IEEE 802.11 standard. The wireless access point storage device detects the RSSI of surrounding devices and identifies the channel that has the least congestion.

Once the process 1100 has identified the least-congested channel (step 1110), the process 1100 switches to the least-congested channel (step 1112), thus improving the data transfer rate of the wireless access point storage device and minimizing transfer times for flight data.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element, node, or feature is directly or indirectly joined to (or directly or indirectly communicates with) another element, node, or feature, and not necessarily mechanically. Likewise, unless expressly stated otherwise, "connected" means that one element, node, or feature is directly joined to (or directly communicates with) another element, node, or feature, and not necessarily mechanically. Thus, although the schematic shown in FIGS. 3-5 depict exemplary arrangements of elements, additional intervening elements, devices, features, or components may be present in embodiments of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for uploading flight data into one or more avionics systems onboard an aircraft, the method comprising:
    establishing, by a computing device, a communication connection to one or more remote servers;
    downloading, by the computing device, a set of flight data via the communication connection;
    transmitting, by the computing device, the set of flight data to a wireless access point storage device onboard the aircraft;
    receiving, by the wireless access point storage device, wireless data transmissions comprising the set of flight data, wherein the wireless access point storage device is communicatively coupled to a data loader device, and wherein the data loader device is communicatively coupled to one or more avionics systems onboard the aircraft;
    extracting the set of flight data from the wireless access point storage device inserted into a storage device reader of the data loader device, wherein the extracting is performed by the data loader device; and
    transmitting, by the data loader device, the set of flight data to the one or more avionics systems, via an avionics communication bus onboard the aircraft;
    receiving, by the wireless access point storage device, a command to deactivate wireless communication functionality, wherein the wireless data transmissions comprise at least the command; and
    deactivating wireless communication functionality, by the wireless access point storage device, in response to receiving the command.

2. The method of claim 1, further comprising:
    obtaining, by a navigation system communicatively coupled to the computing device, a triangulated location of the aircraft;
    performing a comparison, by the computing device, of the triangulated location to a registry comprising a plurality of locations associated with wireless communications regulations;
    determining whether wireless communication onboard the aircraft is permitted, based on the comparison; and
    when wireless communication is not permitted, disabling a wireless communication capability of the wireless access point storage device.

3. The method of claim 1, further comprising:
    obtaining, by a plurality of sensors communicatively coupled to the computing device, a current speed of the aircraft;
    determining, by the computing device, whether the current speed of the aircraft exceeds a predefined threshold; and
    when the current speed of the aircraft exceeds the predetermined threshold, disabling a wireless communication capability of the wireless access point storage device.

4. The method of claim 1, further comprising:
    obtaining, by a navigation system communicatively coupled to the computing device, a triangulated location of the aircraft;
    obtaining, by a plurality of sensors communicatively coupled to the computing device, a current speed of the aircraft;
    determining, by the computing device, whether wireless communication onboard the aircraft is permitted, based on the triangulated location and the current speed of the aircraft; and
    when wireless communication is permitted,
        receiving, by the wireless access point storage device, the wireless data transmissions; and
        extracting the set of flight data, by the data loader device.

5. The method of claim 1, further comprising:
    presenting potential aircraft options, by the computing device;
    receiving, by the computing device, a user input selection of one of the potential aircraft options, wherein the aircraft comprises the one of the potential aircraft options; and
    identifying, by the computing device, the set of flight data stored by the one or more remote servers, based on the user input selection.

6. The method of claim 5, further comprising:
    receiving, by the computing device, user credentials associated with a particular user;
    identifying, by the computing device, the potential aircraft options as being associated with the user credentials;
    presenting, by the computing device, the potential aircraft options associated with the user credentials;
    receiving, by the computing device, the user input selection of one of the potential aircraft options associated with the user credentials, wherein the aircraft comprises the one of the potential aircraft options; and
    identifying, by the computing device, the set of flight data stored by the one or more remote servers, based on the user credentials and the user input selection.

7. The method of claim 1, further comprising:
    monitoring, by the wireless access point storage device, a transmission speed of a current wireless network; and
    when the transmission speed is less than a predetermined threshold,
        cycling through a plurality of network wireless communication channels;
        identifying a least-congested channel, wherein the plurality of network wireless communication channels comprises the least-congested channel; and
        switching to the least-congested channel, by the wireless access point storage device.

8. A system for uploading flight data into one or more avionics systems onboard an aircraft, the system comprising:
    a computing device communicatively coupled to a wireless access point storage device and the navigation system, wherein the computing device is configured to:
        establish a communication connection to one or more remote servers;
        download a set of flight data via the communication connection; and
        transmit the set of flight data to the wireless access point storage device onboard the aircraft;
    the wireless access point storage device positioned inside a storage device reader slot of a data loader device, the wireless access point storage device configured to:
        receive wireless data transmissions comprising at least the set of flight data; and
        permit extraction of the set of flight data by the data loader device; and
    the data loader device communicatively coupled to the one or more avionics systems onboard the aircraft, the data loader device configured to:

extract the set of flight data from the wireless access point storage device inserted into the storage device reader slot of the data loader device; and transmit the flight data to the one or more avionics systems;

wherein the wireless access point storage device is further configured to:

receive a command to deactivate wireless communication functionality, wherein the wireless data transmissions comprise at least the command; and deactivate wireless communication functionality, in response to receiving the command.

9. The system of claim 8, further comprising:

a navigation system onboard the aircraft, the navigation system communicatively coupled to the computing device, and the navigation system configured to provide a triangulated location of the aircraft;

wherein the computing device is further configured to:

compare the triangulated location to a registry of locations associated with wireless communications regulations;

determine whether wireless communication onboard the aircraft is permitted, based on the triangulated location; and when wireless communication is not permitted, disable a wireless communication capability of the wireless access point storage device.

10. The system of claim 8, further comprising:

a plurality of sensors communicatively coupled to the computing device, the plurality of sensors configured to obtain a current speed of the aircraft;

wherein the computing device is further configured to:

determine whether the current speed of the aircraft exceeds a predefined threshold; and when the current speed of the aircraft does not exceed the predetermined threshold, disable a wireless communication capability of the wireless access point storage device.

11. The system of claim 8, further comprising:

a navigation system onboard the aircraft, the navigation system communicatively coupled to the computing device, and the navigation system configured to provide a triangulated location and a current speed of the aircraft; and a plurality of sensors communicatively coupled to the computing device, the plurality of sensors configured to obtain a current speed of the aircraft;

wherein the computing device is further configured to determine whether wireless communication onboard the aircraft is permitted, based on the triangulated location and the current speed of the aircraft;

wherein the wireless access point storage device is configured to receive the wireless data transmissions when wireless communication is permitted; and wherein the data loader device is configured to extract the set of flight data when wireless communication is permitted.

12. The system of claim 8, wherein the computing device is further configured to:

present potential aircraft options;

receive a user input selection of one of the potential aircraft options, wherein the aircraft comprises the one of the potential aircraft options; and identify the set of flight data stored by the one or more remote servers, based on the user input selection.

13. The system of claim 12, wherein the computing device is further configured to:

receive user credentials associated with a particular user;

identify the potential aircraft options as being associated with the user credentials;

present the potential aircraft options associated with the user credentials;

receive the user input selection of one of the potential aircraft options associated with the user credentials, wherein the aircraft comprises the one of the potential aircraft options; and identify the set of flight data stored by the one or more remote servers, based on the user credentials and the user input selection.

14. The system of claim 8, wherein the set of flight data comprises at least one of a flight database, a navigation database, and a flight plan applicable to the aircraft.

15. A flight data upload apparatus onboard an aircraft, the flight data upload apparatus comprising:

a wireless access point storage device configured to:

receive wireless data transmissions via a first wireless communication connection to a computing device, the wireless data transmissions comprising at least a set of flight data;

store the set of flight data in a memory element of the wireless access point storage device, to create a stored set of flight data; and establish a physical communication connection to a data loader device, the physical communication connection configured for data extraction from the wireless access point storage device; and the data loader device communicatively coupled to one or more avionics systems onboard the aircraft, the data loader device configured to:

extract the stored set of flight data via the physical communication connection, to create an extracted set of flight data; and transmit the extracted set of flight data to the one or more avionics systems;

wherein the wireless access point storage device is further configured to:

receive a command to deactivate wireless communication functionality, wherein the wireless data transmissions comprise at least the command; and deactivate wireless communication functionality, in response to receiving the command.

16. The flight data upload apparatus of claim 15, wherein the wireless access point storage device is further configured to:

establish a first communication connection to a computing device onboard the aircraft; and receive the wireless data transmissions via the first communication connection.

17. The flight data upload apparatus of claim 15, wherein the wireless access point storage device is further configured to:

receive a command to deactivate wireless communication functionality via the communication connection to the data loader device; and deactivate wireless communication functionality, in response to receiving the command.

18. The flight data upload apparatus of claim 15, wherein the data loader device is configured to transmit the extracted set of flight data to the one or more avionics systems via a data communication bus onboard the aircraft.

19. The flight data upload apparatus of claim 15, wherein the data loader device is configured to transmit the extracted set of flight data to the one or more avionics systems via a wireless communication connection.

* * * * *